(12) United States Patent
Needham et al.

(10) Patent No.: US 6,925,309 B2
(45) Date of Patent: Aug. 2, 2005

(54) METHOD AND APPARATUS FOR QUICKLY ESTABLISHING A CDMA DISPATCH CALL

(75) Inventors: Michael L. Needham, Palatine, IL (US); Timothy J. Wilson, Rolling Meadows, IL (US); Leigh M. Chinitz, Wellesley, MA (US)

(73) Assignee: Motorola, Inc., Schaumburg, IL (US)

( * ) Notice: Subject to any disclaimer, the term of this patent is extended or adjusted under 35 U.S.C. 154(b) by 259 days.

(21) Appl. No.: 10/027,193

(22) Filed: Dec. 20, 2001

(65) Prior Publication Data

US 2003/0119535 A1 Jun. 26, 2003

(51) Int. Cl.[7] .............................................. H04Q 7/38
(52) U.S. Cl. ...................................... 455/519; 455/455
(58) Field of Search ................................ 455/518, 519, 455/520, 434, 450, 455, 458, 452.1, 521, 448

(56) References Cited

U.S. PATENT DOCUMENTS

| | | | |
|---|---|---|---|
| 5,056,109 A | | 10/1991 | Gilhousen et al. |
| 5,216,692 A | | 6/1993 | Ling |
| 5,257,183 A | | 10/1993 | Tam |
| 5,265,119 A | | 11/1993 | Gilhousen et al. |
| 5,267,262 A | | 11/1993 | Wheatley, III |
| 5,274,837 A | * | 12/1993 | Childress et al. ............ 455/7 |
| 5,323,452 A | | 6/1994 | Dickman et al. |
| 5,383,219 A | | 1/1995 | Wheatley, III et al. |
| 5,457,809 A | * | 10/1995 | Ohnishi ..................... 455/518 |
| 5,465,391 A | * | 11/1995 | Toyryla ..................... 455/518 |
| 5,485,486 A | | 1/1996 | Gilhousen et al. |
| 5,533,094 A | * | 7/1996 | Sanmugam ............... 455/426.1 |
| 5,548,808 A | | 8/1996 | Bruckert et al. |
| 5,590,177 A | | 12/1996 | Vilmur et al. |
| 5,613,209 A | | 3/1997 | Peterson et al. |
| 5,621,723 A | | 4/1997 | Walton, Jr. et al. |
| 5,691,979 A | | 11/1997 | Cadd et al. |
| 5,711,011 A | | 1/1998 | Urs et al. |
| 5,797,097 A | | 8/1998 | Roach, Jr. et al. |
| 5,835,860 A | * | 11/1998 | Diachina ..................... 455/458 |
| 5,852,781 A | | 12/1998 | Ahvenainen |
| 5,878,038 A | | 3/1999 | Willey |
| 5,881,058 A | | 3/1999 | Chen |
| 5,881,368 A | | 3/1999 | Grob et al. |
| 5,887,252 A | | 3/1999 | Noneman |
| 5,914,958 A | | 6/1999 | Chinitz et al. |
| 5,920,549 A | | 7/1999 | Bruckert et al. |
| 5,960,356 A | | 9/1999 | Alperovich et al. |
| 5,987,012 A | | 11/1999 | Bruckert et al. |
| 6,005,848 A | | 12/1999 | Grube et al. |
| 6,058,308 A | | 5/2000 | Kallin et al. |
| 6,075,994 A | * | 6/2000 | Bhat ......................... 455/458 |
| 6,108,518 A | * | 8/2000 | Madour et al. ............ 340/7.25 |
| 6,115,388 A | | 9/2000 | Chinitz et al. |
| 6,169,906 B1 | | 1/2001 | Bruckert |
| 6,178,166 B1 | | 1/2001 | Wilson et al. |
| 6,181,685 B1 | | 1/2001 | Chinitz et al. |
| 6,188,767 B1 | | 2/2001 | Needham et al. |
| 6,233,461 B1 | | 5/2001 | Chinitz et al. |
| 6,331,971 B1 | * | 12/2001 | Raith ........................ 370/311 |
| 6,333,921 B1 | | 12/2001 | Grube et al. |
| 6,377,560 B1 | * | 4/2002 | Dailey ....................... 370/329 |
| 6,449,491 B1 | * | 9/2002 | Dailey ....................... 455/518 |

FOREIGN PATENT DOCUMENTS

| | | |
|---|---|---|
| EP | 0 828 355 A2 | 3/1998 |
| WO | WO 96/31992 A1 | 10/1996 |

* cited by examiner

*Primary Examiner*—Nick Corsaro
(74) *Attorney, Agent, or Firm*—Jeffrey K. Jacobs

(57) ABSTRACT

To address the need for an apparatus and method for quickly establishing a CDMA dispatch call, the present invention provides for paging mobile stations (e.g., 120–123) to inform them of the call and then starting the dispatch call without waiting for page responses from the call participants. The dispatch call is first transmitted by base sites (e.g., 110–112) of all the service coverage areas (e.g., 101–103) that may have call participants, and then discontinued at those base sites where no page responses are received within a period of time. Thus, the dispatch call is established while "call setup" effectively continues.

13 Claims, 3 Drawing Sheets

METHOD AND APPARATUS FOR QUICKLY ESTABLISHING A CDMA DISPATCH CALL

CROSS-REFERENCE TO RELATED APPLICATION

This application is related to the following co-pending applications all filed on even date herewith, all assigned to the assignee of the present application, and all hereby incorporated by reference into the present application: "METHOD AND APPARATUS FOR MOBILE-INITIATED, CDMA-DISPATCH SOFT HANDOFF," "METHOD AND APPARATUS FOR BASE-INITIATED, CDMA-DISPATCH SOFT HANDOFF," "METHOD AND APPARATUS FOR CDMA-DISPATCH SOFT HANDOFF," and "BASE SITE AND METHOD FOR QUICKLY ESTABLISHING A CDMA DISPATCH CALL."

FIELD OF THE INVENTION

The present invention relates generally to the field of wireless communications, and more particularly, to code division multiple access (CDMA) communication systems and dispatch group call communication systems.

BACKGROUND OF THE INVENTION

A typical dispatch two-way radio communication system comprises communication units, communication resources, communication sites, and a communication resource allocator. Each of the sites has a substantially distinct coverage area and is geographically located throughout the system. Each site also has a number of communication resources assigned to it, where at least one of the communication resources is used as a control channel, while a number of the remaining communication resources are used as voice channels. Such systems are known to use both frequency division multiplex access (FDMA) and time division multiple access (TDMA) methods to rebroadcast transmissions.

The communication units are typically arranged into communication groups (talkgroups) and may be located anywhere within the system (in any site). When a communication unit of a talkgroup requests a group call, it transmits, via a control channel of the site in which it is located, an inbound signaling message to the communication resource allocator. (A group call typically allows all members of the same talkgroup that are located within the system to communicate with each other.) The inbound signaling message generally comprises the requesting communication unit's individual identification number, the requesting communication unit's talkgroup, and a request for a group call. Upon receiving the inbound signaling message, the communication resource allocator will allocate a voice channel in each site to the requesting communication unit's talkgroup.

Thus, in FDMA and TDMA dispatch systems a forward link is established (one in each site where communication units are present) and monitored by all units involved in the group call in that site, and a single reverse link which is used by the group member who is currently transmitting to the other members. Non-transmitting talkgroup members are typically in a listen only mode (i.e., not able to transmit when another member is talking) and thus are not allocated a dedicated reverse link. In a TDMA system, for example, time slots are allocated to different users. A talkgroup member transmitting on an assigned reverse link, is allowed to use full power transmission to support short bursts of signals in allocated time slots. Despite the discontinuous or discrete nature of this approach, the listener receives what appears a continuous service.

In the last decade, in response to an ever-accelerating worldwide demand for mobile and personal portable communications, spread spectrum digital technology, of which one type is known as CDMA, has achieved much higher bandwidth efficiency for a given wireless spectrum allocation, and hence has proved to be an excellent alternative for serving large populations of multiple access users, than analog or other digital technologies. CDMA relies on processing power to extract a coded signal embedded across a broad frequency spectrum. The only way to extract the wanted signal from among many other overlaid unwanted signals is to have the right code. The use of coding allows more channels to be derived by the overlaying of carriers one over another and greatly enhances performance in terms of derived channels per hertz of bandwidth.

CDMA is well suited for cellular communications, but has never been employed in a conventional dispatch system. Current CDMA systems employ a form of forward power control. This means that, in a typical one-to-one (cellular) conversation, the communication unit periodically informs the base station how well it is receiving the outbound signal. If possible, the base station reduces its outbound power. If necessary, the base station increases its outbound power. This communication between the base station and the communication unit requires a two-way communication link between the two. In a dispatch situation, the most intuitive outbound power control scheme is for the base station to respond to requests to increase the power coming from any unit that requires it. However, this can only occur if all units involved in the dispatch call have an established two-way communication link.

Reverse power control is another important aspect of CDMA systems. (In fact, this is much more important than forward power control.) Reverse power control attempts to equalize the received signal powers for all communication units controlled by a particular base station. By having the base station monitoring (and accordingly vary) power from listening communication units, the efficiency of CDMA is realized.

In order to avoid excessive interference on the reverse link, communication units accessing the channel for the first time (i.e., before reverse power control has been established) use what is known as "access probes". This means that they access the channel with low power, and slowly ramp up their power until a response from the fixed end tells them that their signal has been received. For cellular communications, the time delay caused by this access method is insignificant. On the other hand, the time delay in setting up a link for a follow-up call during a dispatch group call would be significant and must necessarily have been established in advance. In dispatch, any one of the talkgroup members may want to send an inbound message and then drop back to listening status. If each access required access probes, the delay would be intolerable for a quality dispatch service. One solution is the establishment of multiple reverse (inbound) signaling links for CDMA systems. However, these links must be established in a manner that meets the strict timing requirements of dispatch service.

In today's dispatch systems, the location of talk group members is tracked. That is, as communication units move from one base site to another, the serving base site of each unit is always known by the system. Thus, at the outset of a dispatch group call the system can determine very quickly which base sites must allocate wireless resources to support the call. CDMA cellular systems, however, use location paging. Instead of continuously tracking individual units, pages are broadcast to units during call-setup to determine which base site must support the call. Mobile units monitor a paging channel, and when paged, reply with a page response indicating their serving base site. Typically, the responding units will use access probing to minimize system interference.

While this works well for cellular calls where only one unit needs to be located and sufficient time is allowed during call-setup for the page and page response, it does not work well for locating multiple units within the tight call-setup time allowed for dispatch calls. Depending on the needs of a system's users, dispatch talkgroups can contain ten or more members and can be patched together to create even larger groups. It is likely that group members responding to a page would collide, resulting in retries and delayed responses. Moreover, the use of access probing would further delay responses. Thus, to support dispatch services comparable to those of existing dispatch systems, a CDMA system must determine which base sites are required to support a dispatch call within the strict dispatch call-setup time allowed.

Therefore, an apparatus and method for quickly establishing a CDMA dispatch call is needed.

DESCRIPTION OF A PREFERRED EMBODIMENT

To address the need for an apparatus and method for quickly establishing a CDMA dispatch call, the present invention provides for paging mobile stations to inform them of the call and then starting the dispatch call without waiting for page responses from the call participants. The dispatch call is first transmitted by base sites of all the service coverage areas that may have call participants, and then discontinued at those base sites where no page responses are received within a period of time. Thus, the dispatch call is established while "call setup" effectively continues.

Figure 1:
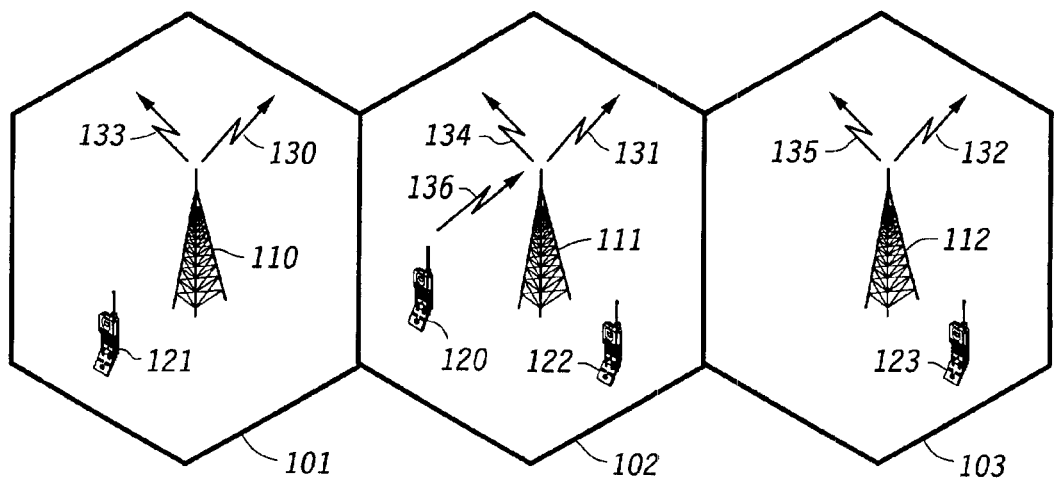
FIG. 1 is a block diagram depiction of a communication system in accordance with a preferred embodiment of the present invention.

The present invention can be more fully understood with reference to FIGS. 1–4, wherein like numerals designate like components. FIG. 1 is a block diagram depiction of communication system 100 in accordance with a preferred embodiment of the present invention. The wireless communication system 100 is a suitably modified CDMA system, such as a Wideband Spread Spectrum Digital Cellular System in accordance with, for example, the Telecommunications Industry Association/Electronic Industries Association Interim Standard 95 (EIA/TIA IS-95) as known in the art.

System 100 comprises a plurality of communication units 120–123 that are each members of different talkgroups. In the preferred embodiment, each of the communication units 120–123 is physically capable of duplex communications, although during typical group communications, only a single communication unit is transmitting at a time.

The fixed infrastructure comprises those elements normally required to support communications within wireless system 100 and, in the preferred embodiment, conforms to a typical CDMA architecture. In particular, the wireless CDMA communication infrastructure comprises well-known components such as base sites 110–112 and their respective service coverage areas 101–103. In practice, the base sites 110–112 typically communicate with one or more base site controllers, a switch, and additional well-known infrastructure equipment not shown. To illustrate the present invention simply and concisely, the communication infrastructure has been limited to that shown in FIG. 1.

Figure 2:
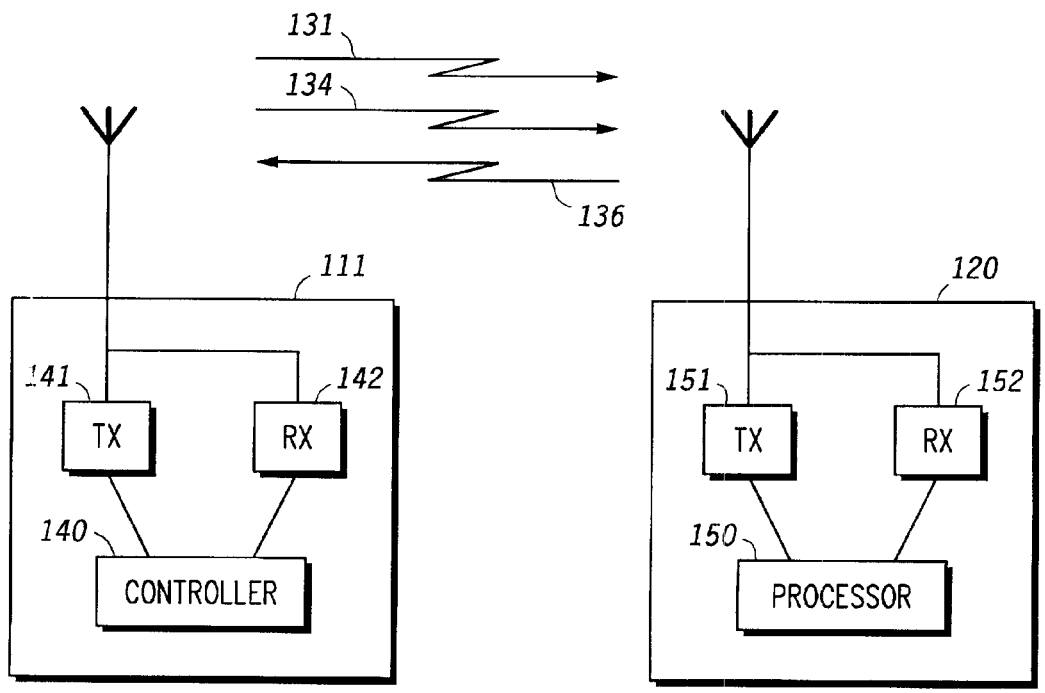
FIG. 2 is a block diagram depiction of a base site and mobile station (MS) from the communication system of FIG. 1 in accordance with a preferred embodiment of the present invention.

FIG. 2 is a block diagram depiction of base site 111 and mobile station (MS) 120 in accordance with a preferred embodiment of the present invention. (The widely-used, term-of-art, "mobile station," is used interchangeably with "communication unit" throughout this description.) Base site 111 comprises transmitter 141, receiver 142, and controller 140. Base sites in general and base site transmitters, receivers, and controllers in particular are well known in the art. Controller 140 preferably comprises one or more memory devices and processing devices such as a microprocessor and a computer memory. In the preferred embodiment, under the control of software/firmware algorithms stored in the memory devices of base site 111, base site 111 performs those tasks required for well-known base site operation and, additionally, the method described relative to FIG. 3.

Each of the communication units 120–123 comprises a common set of elements. In particular, processor 150, which typically comprises one or more processing devices (e.g., microprocessors, digital signal processors, etc.) and memory devices, is coupled to transmitter 151 and receiver 152. Each of these elements is well known in the art. In the preferred embodiment, under the control of software/firmware algorithms stored in the memory devices of MS 120, MS 120 performs those tasks required for well-known MS operation and, additionally, the method described relative to FIG. 4.

CDMA communication channels 130–136 are effectively provided through the use of codes using well-known techniques, e.g., through a combination of orthogonal Walsh codes and pseudorandom noise (PN) sequences. In the preferred embodiment, channels 130–132 comprise outbound paging channels and channels 133–135 comprise outbound traffic channels transmitted by base sites 110–112, respectively. Lastly, channel 136 is preferably an inbound access channel on which MSs may signal base site 111.

Operation of a preferred communication system 100 occurs substantially as follows. When a dispatch call is initiated outbound traffic channels 133–135 are allocated by base sites 110–112, respectively, and broadcast pages are transmitted via outbound paging channels 130–132 indicating that channels 133–135 are to be used for the dispatch call. Upon receiving the dispatch call signal, either via the infrastructure network or from the originating MS, base sites 110–112 transmit the dispatch call via traffic channels 133–135, respectively. Therefore, MSs 120–123, if addressed by the dispatch call, would each receive a page from their serving base site that directs each of them to the serving site traffic channel on which the dispatch call would be transmitted. Thus, the MSs addressed by a dispatch call can begin receiving the dispatch call without signaling the base site beforehand.

In contrast, prior art CDMA systems require a page response to be sent to an MS's base site to inform the base site of the MS's location and need for channel resources (e.g., a traffic channel) to support the new call. As discussed above in the Background section, signaling and receiving a page response can add considerable delay to setting up a call, especially for dispatch calls.

The present invention solves this problem by not requiring a page response before allocating a traffic channel and transmitting the call. However, because the infrastructure does not know the location of all the MSs addressed by the dispatch call before starting the call, it allocates a traffic channel and transmits the call at every base site that may serve such an MS. It is likely, though, that one or more base sites that allocate a channel actually do not serve any MSs targeted by the call. To address this problem, base sites 110–112 monitor for page responses and then cease transmitting and deallocate the traffic channel if no responses are received within a period of time.

For example, in the case of base site 111 where MSs 120 and 122 are not members of the talkgroup targeted by the dispatch call being transmitted on traffic channel 134, neither MS 120 nor MS 122 will respond to the page that is broadcast on paging channel 131. Receiver 142 monitors access channel 136 for page responses, and when none are received within a period of time, controller 140 deallocates the traffic channel and instructs transmitter 141 to cease transmitting the dispatch call via the traffic channel.

In the preferred embodiment, the period of time that a base site will wait for page responses before deallocating the traffic channel is predetermined. The period is preferably based on the theoretical worst case senario for at least one MS to receive the page and respond successfully. Alternatively, the period of time might be adjusted dynamically based on a history of actual MS response times that the infrastructure records.

Now consider that another dispatch call is initiated and MS 120 is a member of the talkgroup targeted. Receiver 152, as instructed by processor 150, would now receive the page for the call and begin receiving the call via traffic channel 134. After joining the call in progress, transmitter 151, as instructed by processor 150, transmits a page response to base site 111 via access channel 136. Receiver 142, monitoring access channel 136 for page responses, receives the page response from MS 120. Having received at least one page response, base site 111 continues transmitting the dispatch call for MS 120 to continue receiving.

One of the problems that dispatch services create for page responses in prior art systems is contention for the common access channel when responding to the same broadcast page. Because many of the MSs addressed by a dispatch call may be located in the same service coverage area, they will all be vying for the same access channel to respond to the page that announces the call. In the preferred embodiment, inbound common access channel 136 is a slotted response channel that allows MSs to randomly determine a slot in which to transmit their page response. Alternatively, an MS could determine a slot in which to respond by hashing its unique ID. Both implementations act to spread out the multiple responses to the transmitted page, and both reduce the likelihood that collisions will occur and further delay the responses.

Thus, the present invention allows CDMA dispatch calls to be established quickly, as compared to cellular calls, by providing for page responses in the background of call setup. Base sites that do not receive any page responses shortly after beginning the call are "pruned" from the call to free the channels that are not needed. Therefore, the present invention provides a relatively simple solution for locating multiple communication units during call setup without delaying the start of the dispatch call. Because of the great importance of call setup time to the perceived quality of dispatch service, the present invention provides a solution with tradeoffs that are consistent with the priorities of dispatch.

Figure 3:
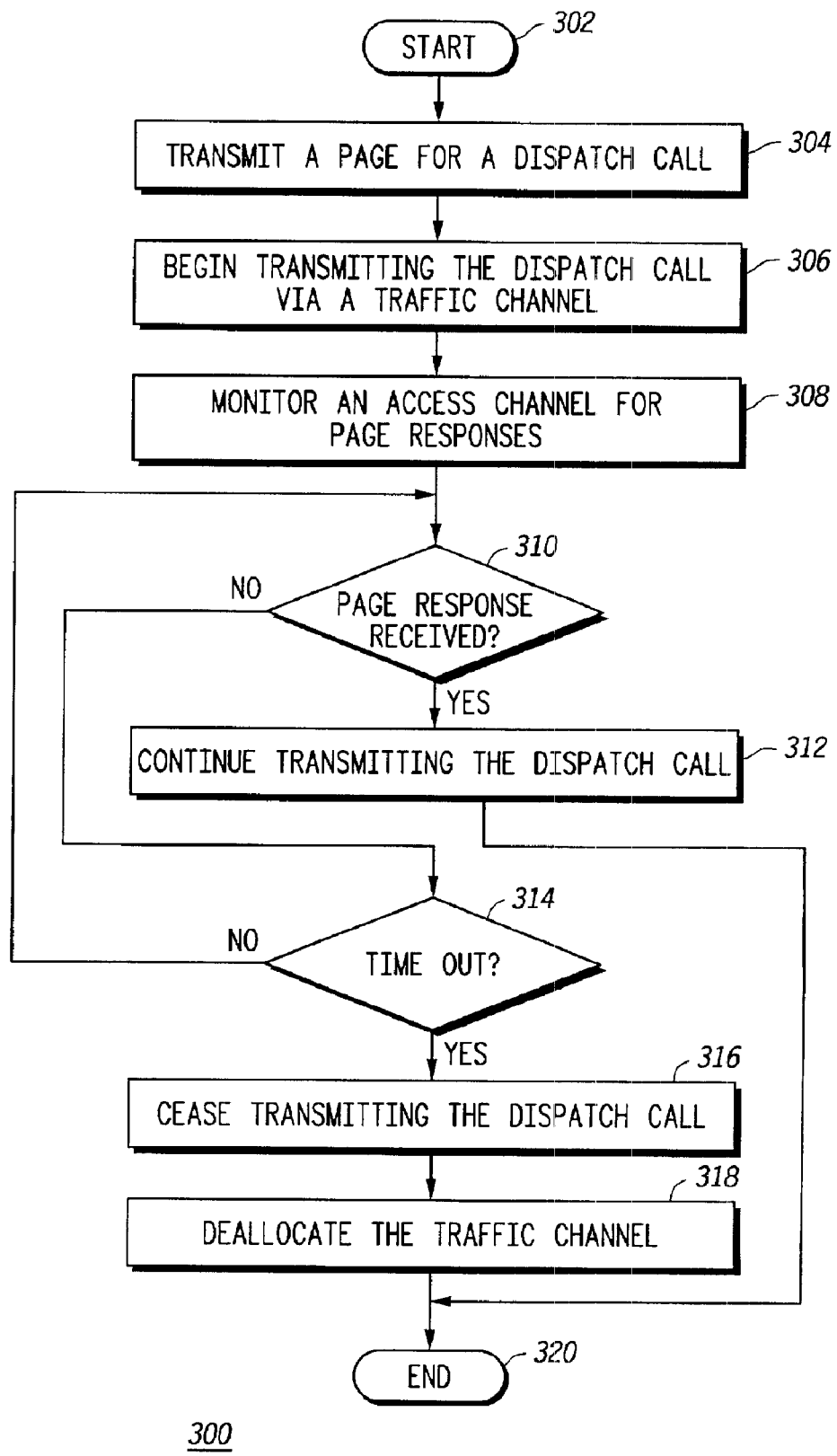
FIG. 3 is a logic flow diagram of steps executed by a base site in accordance with a preferred embodiment of the present invention.

FIG. 3 is a logic flow diagram of steps executed by a base site in accordance with a preferred embodiment of the present invention. Logic flow 300 begins (302) when the base site transmits (304) a page indicating an outbound traffic channel that has been allocated for a dispatch call. Upon receiving the dispatch call source signal, the base site begins (306) transmitting the dispatch call via the traffic channel. The base site also begins monitoring (308) the common access channel on which any page responses will be transmitted. Although transmitting the dispatch call is shown to logically occur before monitoring for page responses, a base site may be continually receiving and decoding signals on the access channel, any one of which may be a response to the page for this dispatch call. Thus, in reality the base site begins transmitting the dispatch call as soon as it can, without regard to page responses, (although often depending on events in other parts of the infrastructure) and may be beginning transmission while at the same time monitoring the access channel for page responses.

If (310) a page response is received, then the base site simply continues (312) transmitting the dispatch call and the logic flow ends. Instead, if (314) a page response is not received within a timeout period then the base site ceases (316) to transmit the dispatch call and deallocates (318) the traffic channel to free it for other services. Thus, logic flow 300 ends (320).

Figure 4:
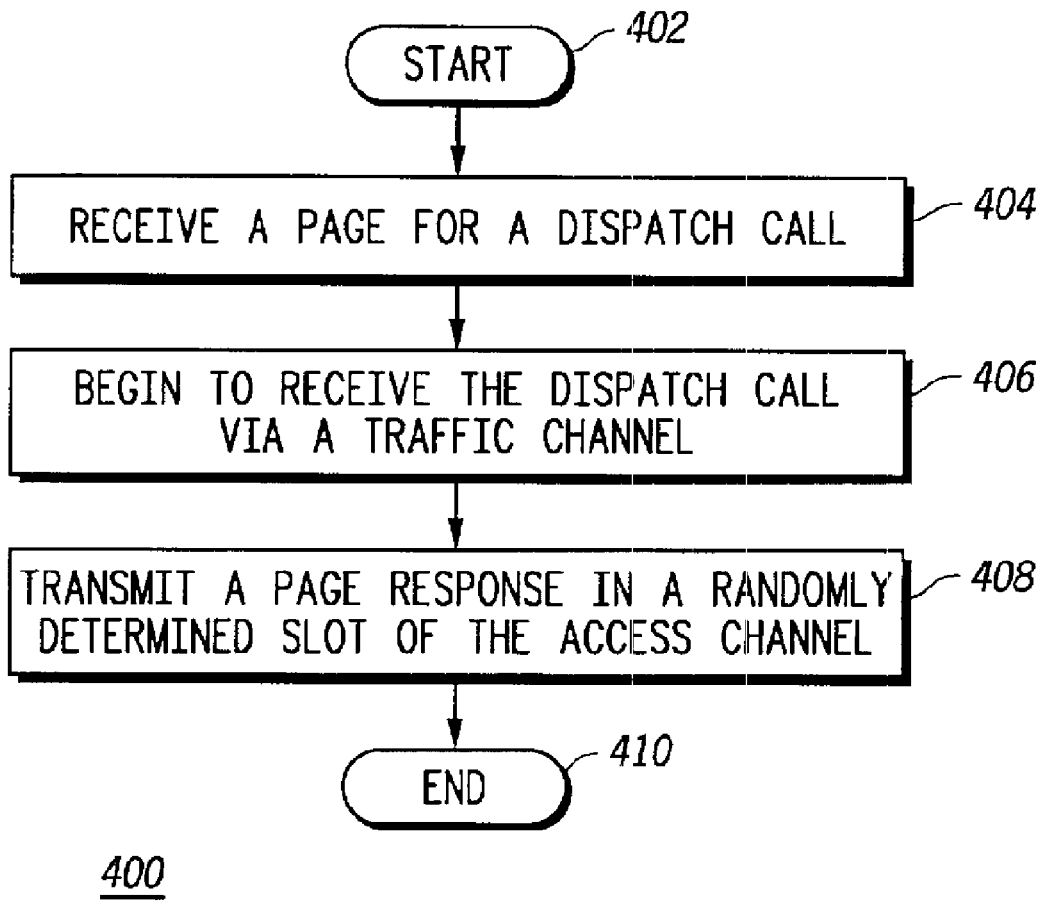
FIG. 4 is a logic flow diagram of steps executed by a mobile station in accordance with a preferred embodiment of the present invention.

FIG. 4 is a logic flow diagram of steps executed by a mobile station in accordance with a preferred embodiment of the present invention. Logic flow 400 begins (402) when the MS receives (404) a page indicating a dispatch call for the MS and an outbound traffic channel on which the call can be received. First, the MS begins (406) to receive the dispatch call via the traffic channel (assuming the base site has begun transmitting the call already). Second, the MS transmits (408) a page response to the base site page in a randomly determined slot of the access channel while continuing to receive the dispatch call via the traffic channel. Thus, logic flow 400 ends (410).

While the present invention has been particularly shown and described with reference to particular embodiments thereof, it will be understood by those skilled in the art that various changes in form and details may be made therein without departing from the spirit and scope of the present invention.

What is claimed is:

1. A method for a base site to quickly establish a CDMA dispatch call comprising the steps of:

transmitting a broadcast page via an outbound CDMA paging channel that indicates an outbound CDMA traffic channel used for the dispatch call, without knowing a location for a mobile station (MS) targeted by the dispatch call;

beginning to transmit the dispatch call via the CDMA traffic channel without having received a page response to the broadcast page from the MS;

monitoring an inbound CDMA common access channel for page responses to the broadcast page;

when no page responses are received within a period of time, ceasing to transmit the dispatch call via the CDMA traffic channel; and deallocating the CDMA traffic channel.

2. The method of claim 1 further comprising the step of continuing to transmit the dispatch call via the traffic channel when at least one page response us received within the period of time.

3. The method of claim 1 wherein the period of time is equivalent to an amount of time for a base site to receive a page response to a broadcast page in a worst case scenario.

4. The method of claim 3 wherein the period of time is predetermined.

5. The method of claim 1 wherein the period of time is determined by the base site based on a history of time taken to respond to broadcast pages.

6. A base site comprising:

a transmitter;

a receiver; and a controller, coupled to the transmitter and receiver, adapted to instruct the transmitter to transmit a broadcast page via an outbound CDMA paging channel that indicates an outbound CDMA traffic channel used for a dispatch call without knowing a location for a mobile station (MS) targeted by the dispatch call, adapted to instruct the transmitter to transmit the dispatch call via the CDMA traffic channel without having received a page response to the broadcast page from the MS, adapted to instruct the receiver to monitor an inbound CDMA common access channel for page responses to the broadcast page; and adapted to deallocate the CDMA traffic channel and to instruct the transmitter to cease transmitting the dispatch call via the CDMA traffic channel When no page responses are received within a period of time.

7. A method for a CDMA mobile station (MS) to quickly join a CDMA dispatch call comprising the steps of:

receiving a broadcast page on an outbound CDMA paging channel that indicates an outbound CDMA traffic channel used for the dispatch call;

beginning to receive the dispatch call via the CDMA traffic channel;

transmitting a page response to the broadcast page subsequent to beginning to receive the dispatch call, wherein the MS transmits the page response on an inbound CDMA common access channel.

8. The method of claim 7 further comprising the step of continuing to receive the dispatch call via the traffic channel subsequent to transmitting the page response.

9. The method of claim 7 wherein the MS transmits the page response in a manner that attempts to avoid concurrent page responses by other MSs.

10. The method of claim 9 wherein the inbound common access channel is a slotted response channel.

11. The method of claim 10 wherein the MS transmits the page response in a randomly determined slot.

12. The method of claim 10 the MS transmits the page response in a slot determined based on the MS's identification number.

13. A mobile station (MS) comprising:

a transmitter;

a receiver adapted to receive a broadcast page on an outbound CDMA paging channel that indicates an outbound CDMA traffic channel used for a dispatch call; and a processor, coupled to the transmitter and receiver, adapted to instruct the receiver to begin to receive the dispatch call via the CDMA traffic channel and adapted to subsequently instruct the transmitter to transmit a page response to the broadcast page via an inbound CDMA common access channel.

* * * * *